United States Patent [19]

Hipwell et al.

[11] Patent Number: 5,556,241
[45] Date of Patent: Sep. 17, 1996

[54] QUICK STOP DEVICE

[76] Inventors: Roger L. Hipwell, 35 Hounds Ditch La., Duxbury, Mass. 02332; Andrew J. Hazelton, 3877 Army St., San Francisco, Calif. 94131

[21] Appl. No.: 378,427

[22] Filed: Jan. 25, 1995

[51] Int. Cl.⁶ ............................ B23C 9/00; B23B 1/00; B23B 35/00; B23Q 17/09
[52] U.S. Cl. ......................... 409/131; 29/DIG. 51; 73/104; 82/1.11; 408/1 R; 408/241 S; 409/218
[58] Field of Search ....................... 409/131, 132, 409/151, 218, 134; 29/DIG. 51; 408/16, 13, 14, 12, 241 S, 1 R; 82/1.11, 101, 173; 73/104, 151; 74/417; 173/1

[56] References Cited

U.S. PATENT DOCUMENTS

| | | | |
|---|---|---|---|
| 3,753,625 | 8/1973 | Fabrizio et al. | 408/239 R |
| 4,576,528 | 3/1986 | Sollami | 451/374 |
| 4,850,753 | 7/1989 | Dudden | 74/417 |
| 5,127,775 | 7/1992 | Broadbent et al. | 409/218 X |

Primary Examiner—William Briggs
Attorney, Agent, or Firm—Timothy D. Stanley; Donald A. Niseen; Gregory A. Cone

[57] ABSTRACT

A quick stop device for abruptly interrupting the cutting of a workpiece by a cutter is disclosed. The quick stop device employs an outer housing connected to an inner workpiece holder by at least one shear pin. The outer housing includes an appropriate shank designed to be received in the spindle of a machine, such as a machine tool. A cutter, such as a drill bit, is mounted in a stationary position and the workpiece, mounted to the workpiece holder, is rotated during engagement with the cutter. A trigger system includes at least one spring loaded punch disposed for movement into engagement with the workpiece holder to abruptly stop rotation of the workpiece holder. This action shears the shear pin and permits continued rotation of the spindle and outer housing without substantially disturbing the chip root formed during cutting.

20 Claims, 3 Drawing Sheets

5,556,241

QUICK STOP DEVICE

FIELD OF THE INVENTION

The present invention relates generally to a quick stop device, for combination with a drilling or cutting machine, that is able to abruptly interrupt the cutting process between a cutting tool and the surface being cut, and more particularly to a device that interrupts the cutting between a drill bit and the interior surface being cut without substantially altering the state of that surface.

BACKGROUND OF THE INVENTION

One aspect of metal cutting research is primarily concerned with the activity occurring between the cutting edge of a tool and the workpiece. For example, it is often necessary to study the zone in which the metal chip is sheared from the remainder of the workpiece, i.e. the zone of contact between the cutting tool and the chip root. To permit this research, it is necessary to effectively freeze the cutting action without substantially disturbing the state of the chip. The chip root can then accurately be studied for various phenomena, such as the plastic deformation that occurs with chip separation.

A variety of quick stop devices are used to abruptly interrupt the cutting process. Those devices abruptly change the relative velocity between the cutting tool and the cutting surface to zero to preserve the workpiece chip formation as accurately as possible. This can be achieved by either accelerating the tool out of the cutting area and away from the workpiece (or conversely, accelerating the workpiece out of the cutting area and away from the tool) or abruptly accelerating the workpiece with the tool remaining in contact.

Existing quick stop devices provide rapid changes in relative velocity according to several different methods. In one method, a cutting tool is moved along a workpiece held by a shear pin. At a predetermined time, an explosive material is ignited and the forces generated break the shear pin and abruptly drive the cutting tool away from the workpiece.

Other devices combine the cutting force with a spring force to quickly move the tool away from the workpiece during cutting. This method, however, is subject to the relatively small cutting and spring forces, often rendering insufficient acceleration of the tool relative to the workpiece. Some devices simply break the cutting tool, either mechanically or by using the force of an explosion to force a hammer against the tool. The force breaks the tool and moves it away from the cutting area.

Problems with existing devices include the relatively long time required and the difficulty involved with setting up the devices for experimentation. This is particularly true for ballistic or explosive quick stop designs. It is also difficult to adapt existing designs to a variety of different cutting machines, e.g. various machine tools. At the same time, it may be desirable to use the quick stop devices with a variety of different machine tools that can, for instance, accommodate varying sizes of cutters.

Some existing quick stop devices work adequately for examining the metallurgical configuration of a longitudinal cut along a workpiece. However, the devices are inadequate for investigating the cutting of a workpiece by a drill bit in which the cutting takes place along a circular interior surface.

The present invention addresses the various drawbacks of existing quick stop devices.

SUMMARY OF THE INVENTION

The present invention relates generally to an apparatus and method for abruptly interrupting the cutting of a workpiece by a cutter. The apparatus is designed to cooperate with a machine having a spindle rotatable about an axis.

The apparatus includes a spindle mount adapted for attachment to the rotatable spindle. The spindle mount includes a housing and a workpiece holder to which the workpiece may be attached. The housing and the workpiece holder are connected by at least one shear pin so the workpiece holder and housing rotate together during cutting. The workpiece holder also includes at least one stop that moves along an annular path.

A cutter holder is adapted to hold the cutter, e.g. a drill bit, in a stationary position for cutting contact with the workpiece while the workpiece is rotated by the workpiece holder. The cutter holder preferably holds the cutter in general alignment with the axis about which the spindle rotates.

The apparatus also includes a trigger system having a plunger and an actuator mechanism. When the actuator mechanism is triggered during rotation of the spindle mount, the plunger is forced into the annular path. Because of the rotation of the workpiece holder, the plunger engages the stop and abruptly terminates rotation of the workpiece holder. This engagement breaks the shear pin to permit continued rotation of the spindle and the housing.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

Figure 1:
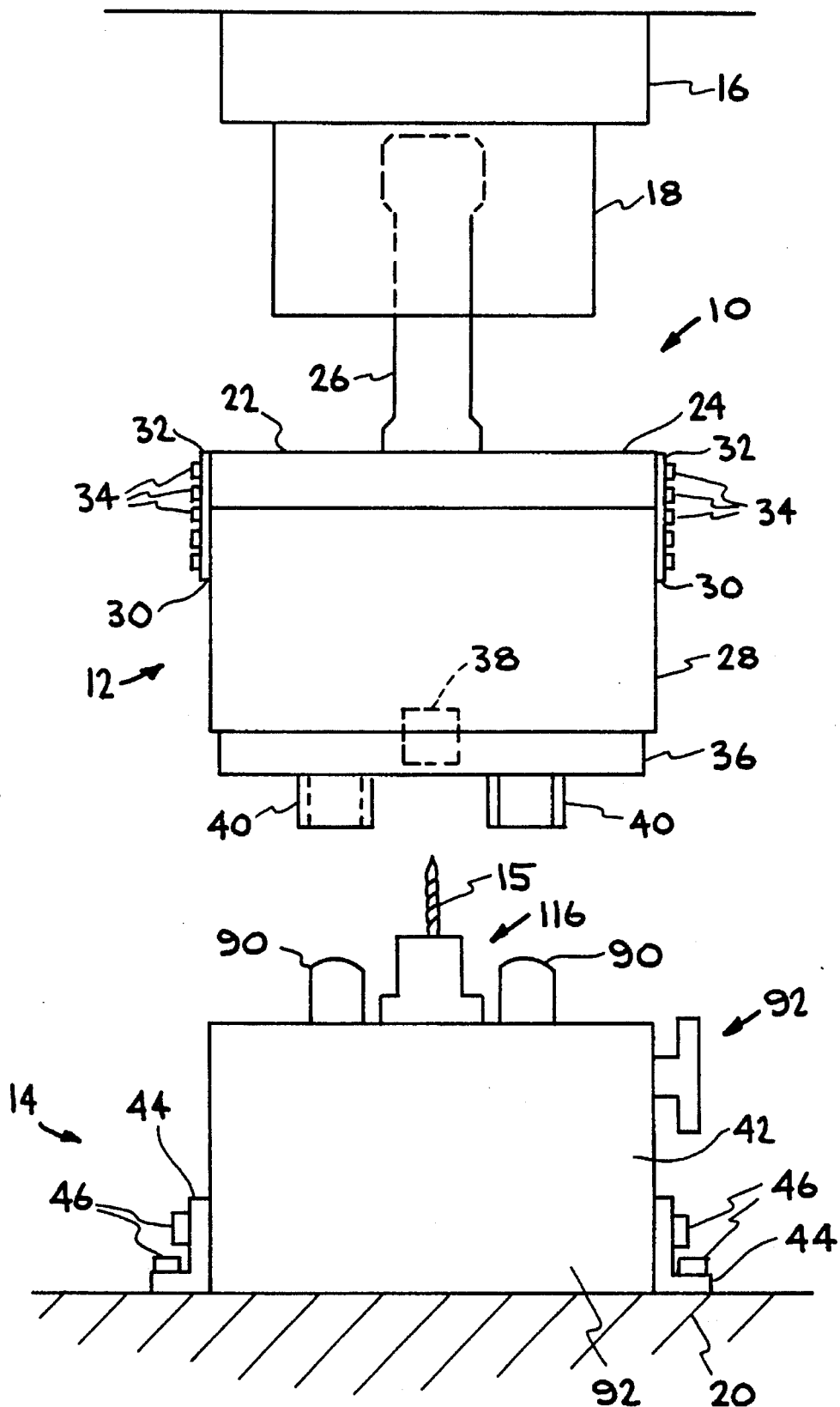
FIG. 1 is a schematic representation of a quick stop device according to a preferred embodiment of the invention and mounted in a machine having a rotatable spindle.

Referring generally to FIG. 1, an exemplary quick stop device generally indicated as 10 is shown to include a spindle mount 12 and a cutter holder 14. Spindle mount 12 is adapted for connection to a machine 16, such as a machine tool, having a rotatable spindle 18. Cutter holder 14 is securely attached to a support structure 20 that may be connected to the base of machine 16.

Generally, spindle mount 12 includes a universal mount 22 having a mounting plate 24 from which extends a shank 26 in a generally transverse direction. Shank 26 is configured for insertion into spindle 18 for coincident rotation therewith.

Mounting plate 24 is attached to a housing 28, preferably by a plurality of fastener brackets 30. Each fastener bracket 30 includes a metal plate 32 extending across the joint between mounting plate 24 and housing 28. Metal plates 32 may be securely attached to housing 28 and mounting plate 24 by a plurality of bolts 34 threaded into the side of mounting plate 24 and housing 28.

Housing 28 is connected to a workpiece holder 36 configured to hold a workpiece 38 illustrated in phantom lines in FIG. 1. Workpiece holder 36 further includes at least one stop and preferably a pair of stops 40. Stops 40 are designed to interact with cutter holder 14 when the rotation of workpiece holder 36 is selectively terminated with respect to the rotation of housing 28 and spindle 18.

Cutter holder 14 includes a base 42 securely attached to support structure 20. Preferably, base 42 is attached to support structure 20 by a plurality of brackets 44 that include bolts 46 threaded into support structure 20 and base 42, respectively. However, other attachment methods, such as welding, can also be used to attach base 42 to support structure 20.

Figure 2:
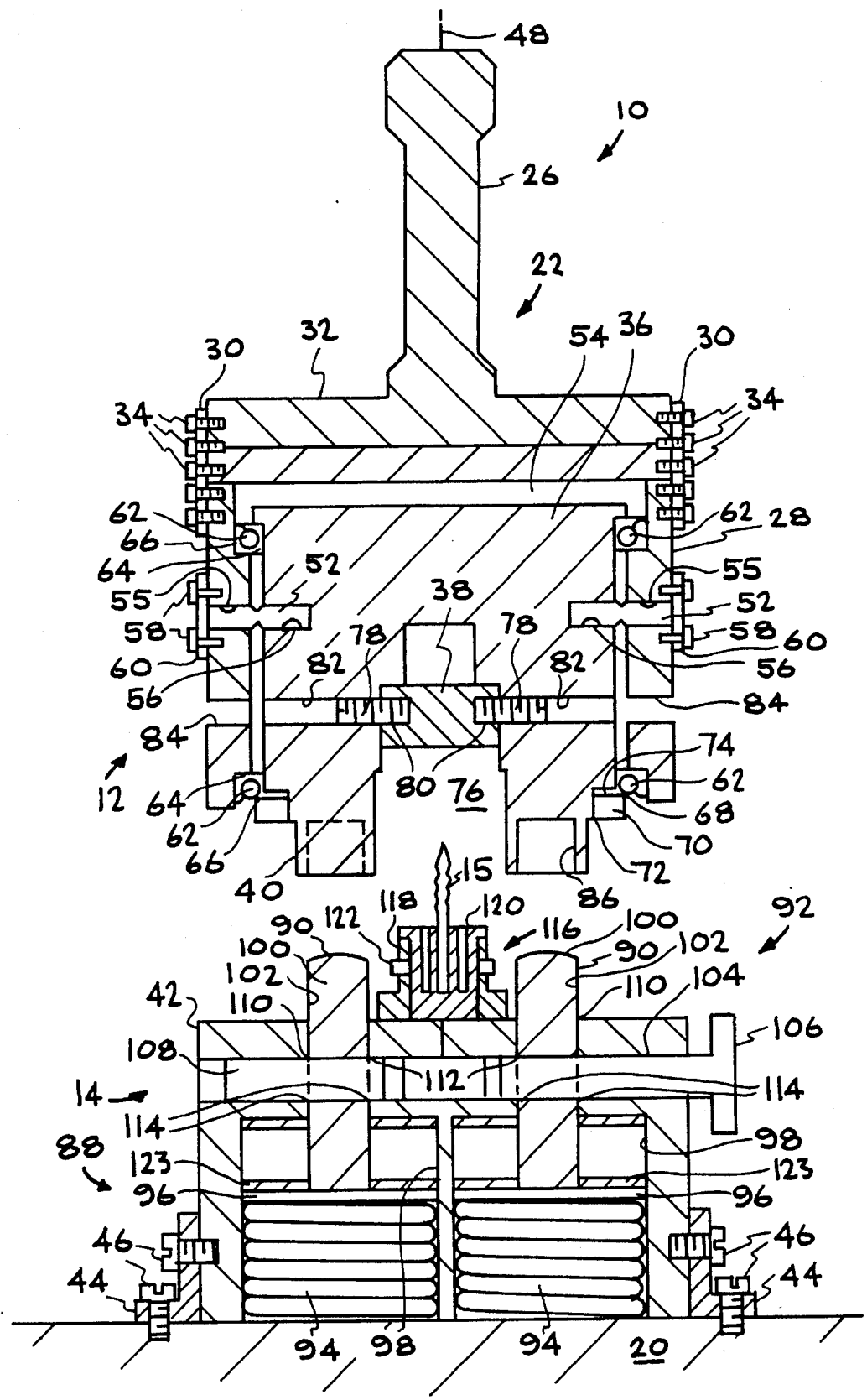
FIG. 2 is a cross-sectional view of the various components of the quick stop device illustrated in FIG. 1 wherein the system is in an unactuated position.
Figure 3:
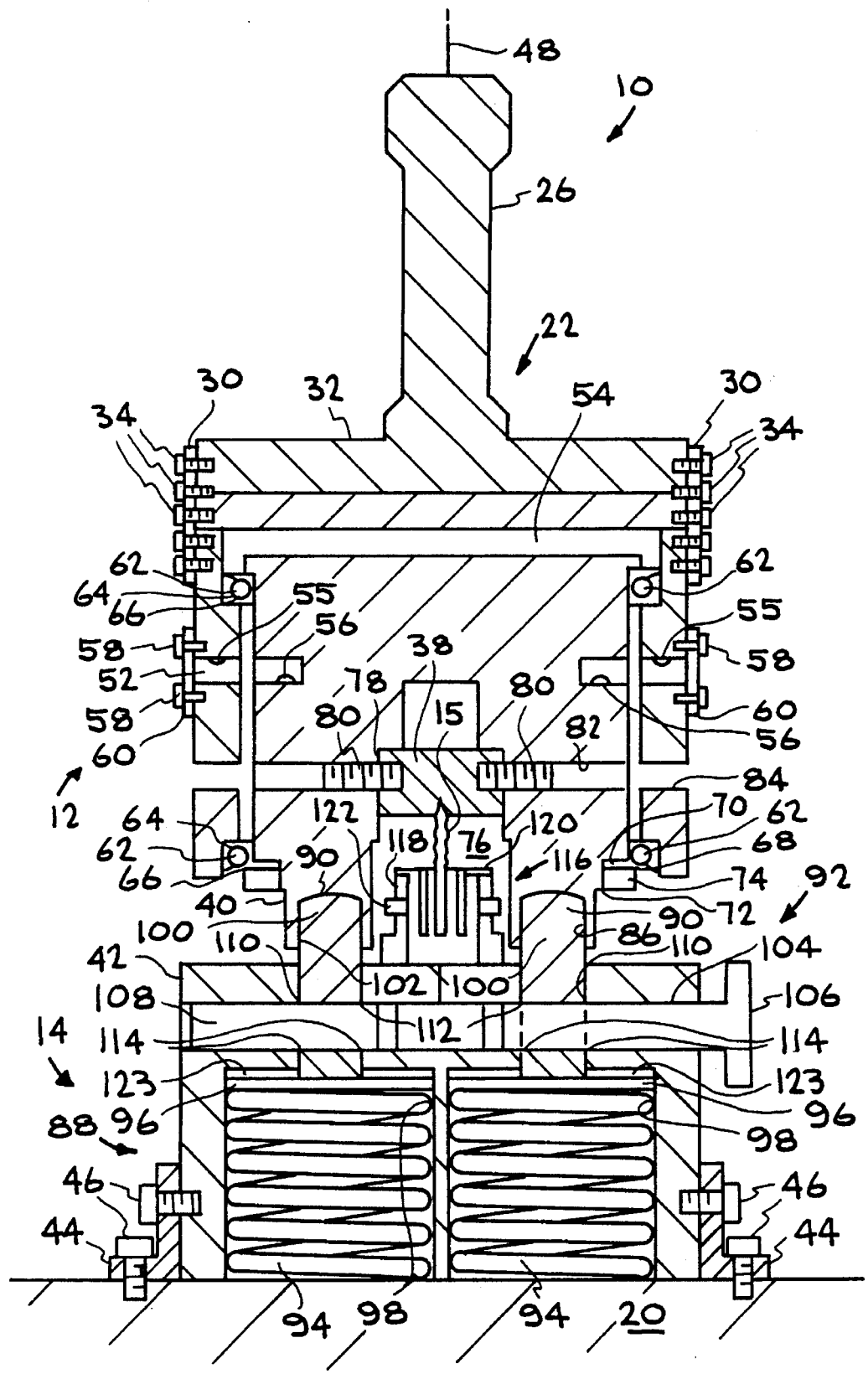
FIG. 3 is a cross-sectional view of the various components of the quick stop device illustrated in FIG. 1 wherein the system is in an actuated position.

Housing 28 is shown in detail in FIGS. 2 and 3 to include a longitudinal axis 48 about which it rotates. Housing 28 also preferably includes a hollow interior 54 receiving at least a portion of workpiece holder 36. Workpiece holder 36 is connected to housing 28 by at least one and preferably at least a pair of break-away members, such as pins 52, e.g. shear pins, extending between housing 28 and workpiece holder 36. Pins 52 may be disposed generally perpendicularly to longitudinal axis 48 through corresponding bores 55 in housing 28 and into adjacent bores 56 formed in workpiece holder 36. Pins 52 are preferably held in place by fasteners, such as bolts 58, extending through a shear pin cap 60 and threaded into housing 28.

Workpiece holder 36 and housing 28 are separated by a pair of bearings 62, such as annular ball bearings or other bearings that would be known to one of ordinary skill in the art. Bearings 62 are retained in a pair of annular ridges 64 disposed along the hollow interior 54 of housing 28. Annular ridges 64 cooperate with a pair of external annular ridges 66 disposed along the outer perimeter of workpiece holder 36. The spacing of external annular ridges 66 may be adjusted by a shim 68 and a threaded ring 70 to securely hold bearings 62 between annular ridges 64 of housing 28 and annular ridges 66 of workpiece holder 36. In this embodiment, threaded ring 70 includes one of the external annular ridges 66. Ring 70 is threaded onto a radially recessed portion 72 of workpiece holder 36. Thus, by sliding shim 68 over the recessed portion 72 and threading ring 70 thereon, shim 68 is trapped between ring 70 and an upper wall 74 of radially recessed portion 72. This establishes the distance between external annular ridges 66, but permits this distance to be adjusted by interchanging one shim 68 with another shim having a different thickness.

Workpiece holder 36 further includes an internal cavity 76 for receiving workpiece 38. Workpiece 38 may be held in place by a variety of methods, but preferably workpiece 38 includes threaded bores 78 sized to receive set screws 80 inserted through radially extending bores 82 and 84 in workpiece holder 36 and housing 28, respectively.

Workpiece holder 36 also has at least one and preferably at least two stops 40 extending longitudinally downward for cooperation with cutter holder 14. Stops 40 may include grooves, such as semi-circular grooves 86.

Cutter holder 14 incorporates a trigger system 88 having at least one biased plunger 90 and preferably at least two plungers 90 disposed to move into cooperation with stops 40. Trigger system 88 further includes an actuator mechanism 92 that may be selectively triggered to permit the movement of plungers 90 into the annular path along which stops 40 move during rotation. Plungers 90 may be biased by a variety of methods, such as pneumatic pressure, mechanical leverage, or springs, such as coil springs 94 illustrated in FIG. 2.

In the embodiment illustrated in FIG. 2, each plunger 90 has a bottom plate 96 disposed for reciprocation within an opening, such as a cylinder 98, disposed in the interior of base 42. Plunger 90 also includes an extension 100, such as a cylindrical pin, connected to bottom plate 96 disposed generally transversely thereto. Each extension 100 is adapted for reciprocable movement through a longitudinal bore 102 formed in the top of base 42. Each coil spring 94 is located on the opposite side of the corresponding bottom plate 96 from extension 100. Thus, each coil spring 94 is compressed between its corresponding bottom plate 96 and support structure 20 to provide a force that biases each plunger upwardly towards stops 40.

Springs 94 are held in their compressed state and selectively released by actuator mechanism 92. In the preferred embodiment, actuator 92 is a pin slidably disposed in a transverse bore 104 that extends generally perpendicularly to longitudinal bores 102. Actuator mechanism 92 includes a handle 106 connected to a pin 108 that slides within transverse bore 104. Pin 108 has contoured openings 110 through which extensions 100 pass. In this embodiment, extensions 100 each include an annular recessed area 112 having a ridge 114. Contoured openings 110 are configured to interfere with ridge 114 to prevent upward movement of plungers 90 when actuator mechanism 92 is in the unactuated position shown in FIG. 2. However, contoured openings 110 are formed with an expanded area permitting longitudinal movement of plungers 90 when actuator mechanism 92 is moved to its actuated position as illustrated in FIG. 3.

When actuator mechanism 92 is moved to the actuated position, springs 94 rapidly move plungers 90 upward into the annular path along which stops 40 move. Thus, stops 40, and particularly the surface of grooves 86, engage plungers 90 preventing further movement of workpiece holder 36. The force of the rotating spindle 18 and housing 28 break shear pins 52 to permit continued rotation of spindle 18 and housing 28 while prohibiting further rotation of workpiece holder 36 or workpiece 38. This action abruptly stops further cutting of workpiece 38 by cutter 15. The abrupt stoppage leaves a chip root in workpiece 38 representative of the chip root continuously formed during the actual dynamic cutting of the material of workpiece 38 by a specific cutter 15. This allows examination of the metallurgical properties of the chip root formed during a dynamic cutting operation.

Cutter 15 is typically a drill bit mounted to the top of base 42 by a tool holder 116. In the preferred embodiment, tool holder 116 may include a floating reamer holder 118, such as the model No. T19-5/8 No. ST007967 distributed by Hardinge Brothers Inc. of Elmira, N.Y. Cutter drill bit 15 is physically held in place by a tool holder bushing 120, such as the model No. HDB2 1763-00-19 tool holder bushing distributed by Hardinge Brothers Inc. of Elmira, N.Y. Tool holder bushing 120 is securely attached to floating reamer holder 118 by a set screw 122. Thus, by loosening set screw 122, different tool holder bushings may be inserted to allow the use of cutters having different diameters.

In an actual test situation, housing 28 is connected to workpiece holder 36 by pins 52. Workpiece 38, of a given material, is then mounted within workpiece holder 36 by set screws 80. Shank 26 of spindle mount 12 is inserted into spindle 18 of machine 16 and secured thereto. An appropriate test cutter 15 is selected and mounted in tool holder bushing 120 and secured to cutter holder 14.

Machine 16 rotates spindle 18 and moves the spindle longitudinally downwardly until workpiece 38 contacts cutter 15 and the cutting operation begins. At a desired time, trigger system 88 is actuated or triggered by actuator mechanism 92. This permits springs 94 to drive plungers 90 longitudinally upward into the annular path of rotation followed by stops 40. As soon as stops 40 rotate into plungers 90, pins 52 break and workpiece holder 36 abruptly stops, while housing 28 and spindle 18 continue to rotate. Bottom plates 96 preferably include a damper cushion 123 to limit the vibrational effects of plates 96 contacting housing 20.

It will be understood that the foregoing description is of preferred exemplary embodiments of this invention and that the invention is not limited to the specific forms shown. For example, the plungers may be of a variety of configurations; there may be one or more stops and corresponding plungers; the cutter may be stationary or movable; the workpiece holder may be mounted internally or externally with respect to the housing; and the shear pins may be mounted in a variety of orientations. These and other modifications may be made in the design and arrangement of the elements without departing from the scope of the invention as expressed in the appended claims.

What is claimed is:

1. An apparatus for abruptly interrupting the cutting of a workpiece by a cutter, the apparatus being designed to cooperate with a machine having a spindle rotatable about an axis, comprising:

a spindle mount adapted for attachment to the spindle, the spindle mount including a housing and a workpiece holder to which the workpiece may be attached, the housing and the workpiece holder being connected by a shear pin, the workpiece holder also including at least one stop that rotates along an annular path;

a cutter holder adapted to hold the cutter in a stationary position for cutting contact with the workpiece while the workpiece is rotated by the workpiece holder; and a trigger system including a plunger and an actuator mechanism, wherein when the actuator mechanism is triggered during rotation of the spindle mount, the plunger is forced into the annular path, abruptly terminates rotation of the workpiece holder when struck by the stop, and shears the shear pin to permit continued rotation of the housing.

2. The apparatus as recited in claim 1, wherein the workpiece holder is connected to the housing by a pair of shear pins.

3. The apparatus as recited in claim 2, wherein the shear pins extend generally radially with respect to the axis.

4. The apparatus as recited in claim 1, wherein the workpiece holder and the housing are separated by at least one bearing.

5. The apparatus as recited in claim 4, wherein the bearings comprise ball bearings.

6. The apparatus for the cutting of a workpiece as recited in claim 1, wherein the workpiece holder includes a cavity configured to receive the workpiece.

7. The apparatus as recited in claim 6, wherein the workpiece is secured within the cavity.

8. The apparatus as recited in claim 7, wherein the workpiece is secured within the cavity by a set screw.

9. The apparatus as recited in claim 1, wherein the workpiece holder stop includes a groove disposed generally on opposite sides of an axis of rotation.

10. The apparatus as recited in claim 9, wherein the trigger system includes a pair of plungers, each plunger being disposed to enter a separate groove.

11. The apparatus as recited in claim 9, wherein the actuator mechanism includes a spring biased against the plunger and a movable release bar that prevents the plunger from engaging the groove until the release bar is moved.

12. The apparatus as recited in claim 11, wherein the workpiece holder includes a pair of stops each having a groove and the trigger system includes a pair of plungers disposed to engage the grooves, the pair of plungers being biased by a pair of springs.

13. An apparatus for cooperating with a machine having a spindle rotatable about an axis and for abruptly interrupting the cutting of a workpiece by a drill bit, comprising:

a spindle mount adapted for attachment to the spindle, the spindle mount including an outer housing rotatable about the axis, a workpiece holder mounted at least partially within the outer housing, and a shear pin connecting the workpiece holder to the outer housing, wherein the workpiece holder also includes a workpiece attachment area and a pair of stops that travel along an annular path;

a drill bit holder adapted to hold the drill bit while the workpiece is rotated against the drill bit; and a trigger system including a pair of plungers, a spring loaded actuator configured to move the plungers into the annular path, and a release mechanism that selectively releases the plungers to permit the actuator to move the plungers into the annular path during rotation of the spindle mount, wherein movement of the plungers into the annular path causes contact with the stops and abruptly terminates rotation of the workpiece holder and shears the shear pin to permit the outer housing to continue its rotation.

14. The apparatus as recited in claim 13, wherein the trigger system includes a framework having a pair of guide openings through an abutment wall to guide the plungers.

15. The apparatus as recited in claim 14, wherein the actuator includes a pair of coil springs disposed within the framework to act against the plungers.

16. The apparatus as recited in claim 15, wherein the release mechanism comprises a movable slide bar mounted in the framework.

17. The apparatus as recited in claim 16, wherein each plunger includes a radially extending plate at one end, the radially extending plate cooperating with the abutment wall to limit movement of each plunger when they are released by the movable slide bar.

18. The apparatus as recited in claim 17, further comprising a damper material disposed between the abutment wall and the radially extending plate.

19. A method for abruptly interrupting the cutting of a workpiece by a cutter to facilitate examination of characteristics of the cut, comprising the steps of:

securing the workpiece within a rotatable workpiece holder having a stop that travels along an annular path during rotation;

fastening the workpiece holder to an outer housing by a shear pin;

mounting the cutter in proximity to the workpiece holder;

rotating the outer housing and the workpiece holder;

moving the workpiece into contact with the cutter;

cutting the workpiece; and forcing a plunger into the annular path to abruptly stop rotation of the workpiece holder, thereby shearing the shear pin to permit continued rotation of the outer housing.

20. The method for abruptly interrupting the cutting of a workpiece as recited in claim 19, further comprising the steps of:

biasing the plunger with a coil spring;

holding the plunger away from the stop; and selectively releasing the plunger to permit the coil spring to force it into the annular path.

* * * * *